W. H. HOLAHAN.
WHEEL.
APPLICATION FILED MAY 20, 1918.
1,334,493.
Patented Mar. 23, 1920.
3 SHEETS—SHEET 1.
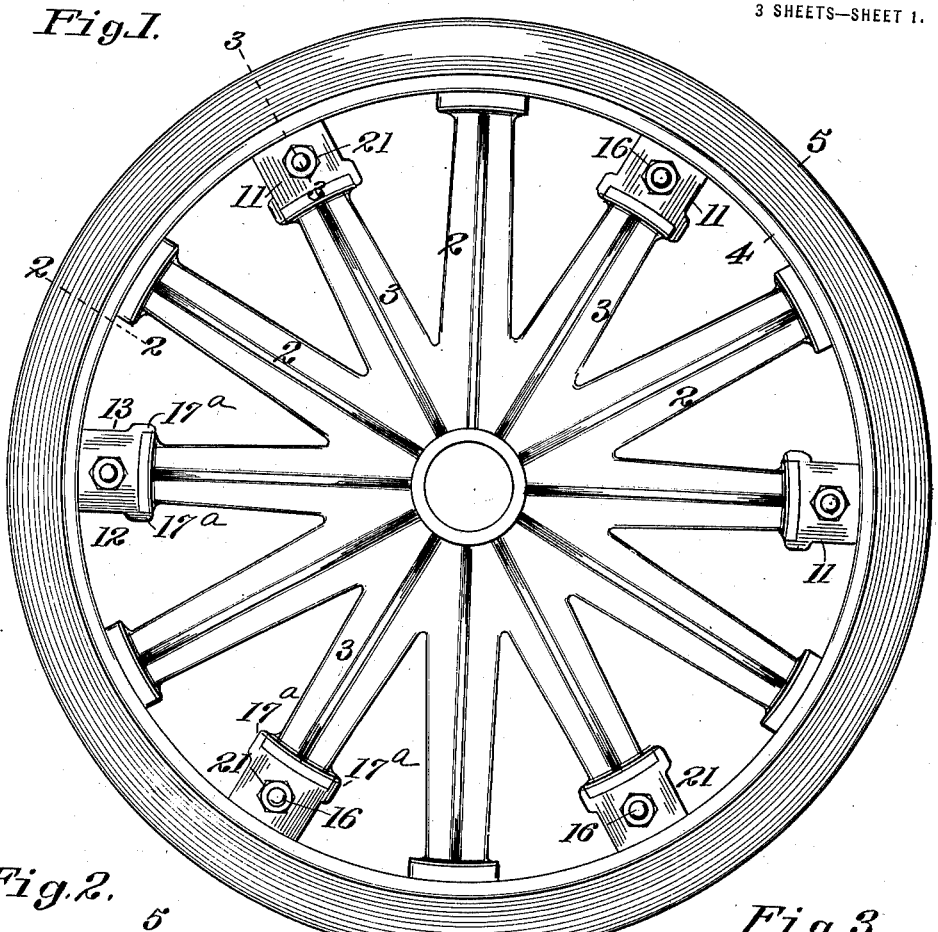
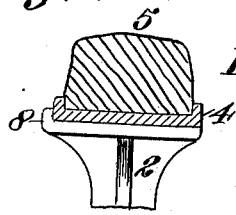
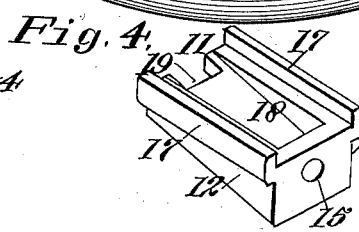
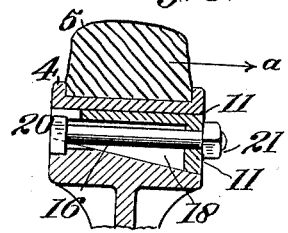
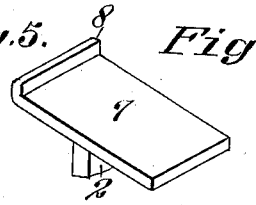
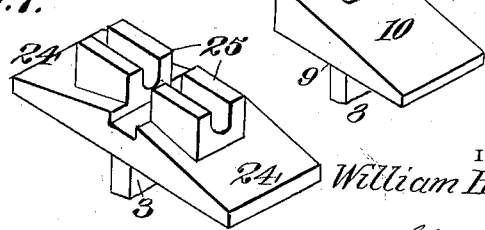
INVENTOR
William H. Holahan
BY Strong & Townsend
ATTORNEYS

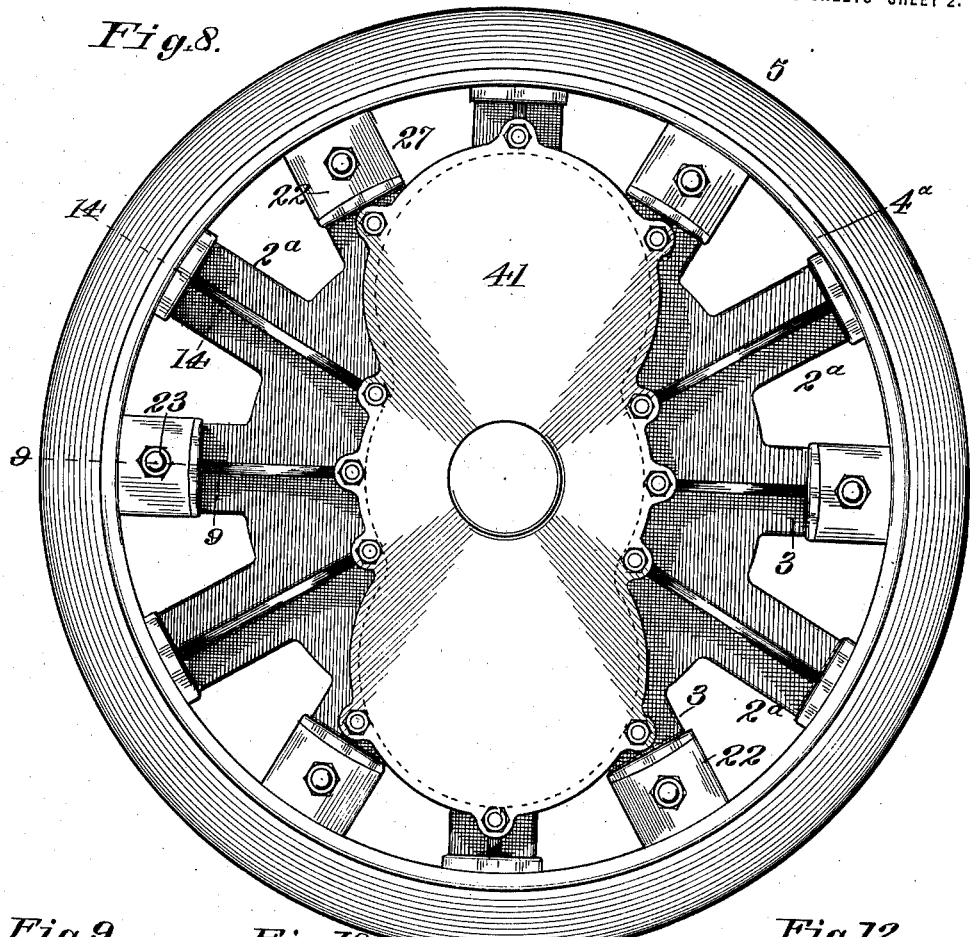
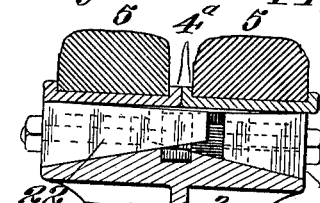
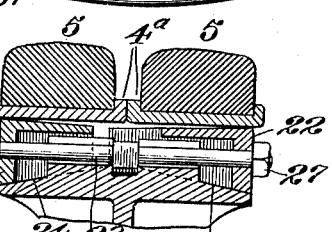
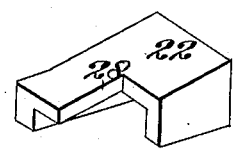
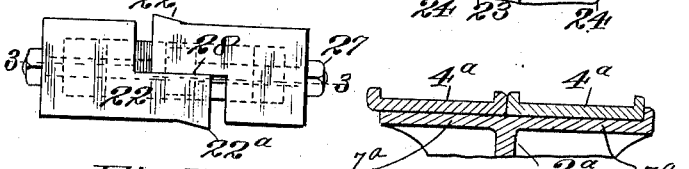

W. H. HOLAHAN.
WHEEL.
APPLICATION FILED MAY 20, 1918.

1,334,493.

Patented Mar. 23, 1920.
3 SHEETS—SHEET 3.

INVENTOR
William H. Holahan
BY Strong & Townsend
ATTORNEYS

UNITED STATES PATENT OFFICE.

WILLIAM H. HOLAHAN, OF SAN FRANCISCO, CALIFORNIA, ASSIGNOR TO HOL-MOR WHEEL COMPANY, OF SAN FRANCISCO, CALIFORNIA, A CORPORATION OF CALIFORNIA.

WHEEL.

1,334,493.   Specification of Letters Patent.   Patented Mar. 23, 1920.

Application filed May 20, 1918. Serial No. 235,438.

*To all whom it may concern:*

Be it known that I, WILLIAM H. HOLAHAN, a citizen of the United States, residing at the city and county of San Francisco and State of California, have invented new and useful Improvements in Wheels, of which the following is a specification.

This invention relates to a wheel, and particularly to a wheel for trucks, tractors, and the like.

One of the objects of the present invention is to provide a simple, substantial wheel for trucks, tractors, and the like which are employed for heavy duty work, such as hauling and plowing; and also to provide a detachable and interchangeable rim or tread member which may be quickly removed and rigidly secured when in place. Another object of the invention is to provide a novel locking mechanism for securing the rim on the wheel and also a novel spoke structure for the reception of the lock and rim. Further objects will hereinafter appear.

The invention consists of the parts and the construction and combination of parts as hereafter more fully described and claimed, having reference to the accompanying drawings, in which—

Figure 1 is a side elevation of the wheel.

Fig. 2 is a cross section on the line 2—2 of Fig. 1.

Fig. 3 is a cross section on line 3—3 of Fig. 1.

Fig. 4 is a perspective view of one of the locking wedges.

Fig. 5 is a perspective view of the outer end of one of the supporting spokes.

Fig. 6 is a perspective view of the outer end of one of the wedge-supporting spokes.

Fig. 7 is a similar view of a double wedge-supporting spoke employed with the wheel shown in Figs. 8, 15 and 16.

Fig. 8 is a side elevation of a modified form of the wheel.

Fig. 9 is a cross section on line 9—9 of Fig. 8, showing the locking wedges in side elevation.

Fig. 10 is a similar section showing the locking wedges in section.

Fig. 11 is a plan view of the locking wedges shown in Figs. 9 and 10.

Fig. 12 is a perspective view of one of the locking wedges shown in Figs. 9, 10 and 11.

Fig. 13 is a perspective view of the locking bolt employed in connection with the locking wedges.

Fig. 14 is a cross section on line 14—14 of Fig. 8, showing the tire sections removed.

Figure 16:
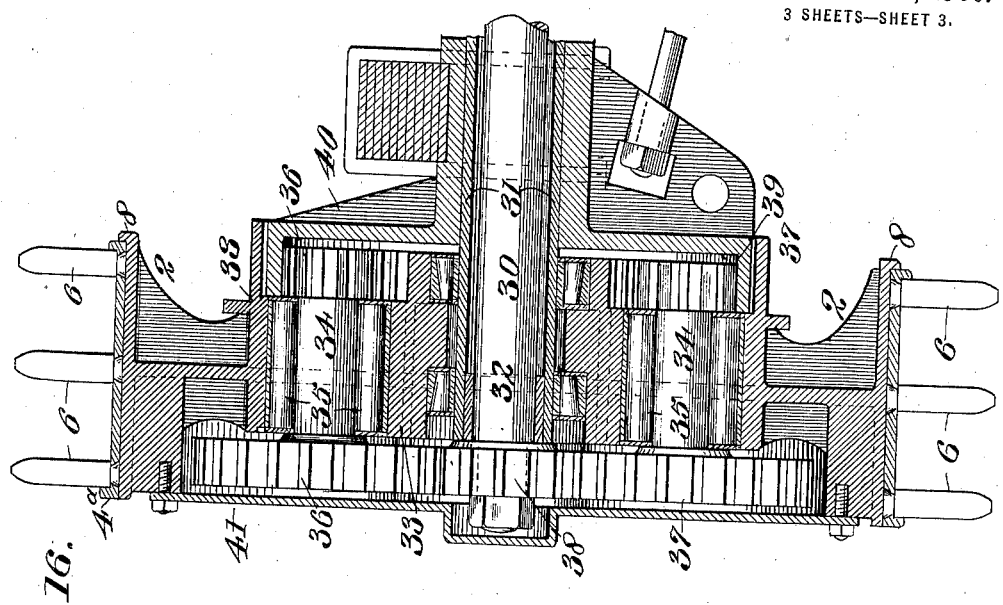
Fig. 16 is a cross section of the wheel shown in Figs. 8 and 15.

Referring to the drawings in detail, A indicates the hub of the wheel, 2 a plurality of supporting spokes, and 3 a plurality of wedge or lock-supporting spokes. Adapted to be carried by the spokes 2 and 3 is a unitary rim 4 which may be provided for the purpose of supporting a solid rubber tire, such as shown at 5, or a grouser or spiked rim, such as shown at 6 in Fig. 16. The outer faces of the spokes 2 are turned down to form a plurality of seats for the rim 4, such as shown at 7; a shoulder being provided on the inner side, as at 8, to prevent the rim from moving laterally off the seats formed on the spokes.

The other spokes, shown at 3, are also provided with seats 9, as shown in Figs. 3 and 6, but their outer faces are inclined, as at 10, to receive a locking wedge 11. The type of wedge employed is more particularly shown in Figs. 3 and 4; that is, each wedge consists of two side sections 12 and 13, an end section 14 which is perforated, as at 15, to permit a locking bolt 16 to pass therethrough, and a pair of downwardly projecting flanges 17 which are adapted to embrace the sides of the seat 10, as shown at 17$^a$ in Fig. 1. Each wedge is otherwise cored out, as shown at 18, to permit the locking bolt to freely pass therethrough, and the outer end or seat section 10 of each spoke 3 is cored out, as at 19, to receive the head 20 of the bolt and secure the same against turning movement when the nut 21 is being tightened.

In actual operation, when machining a wheel of the character described, it is only necessary to turn off or finish the outer faces 7 of the spokes 2. The actual diameter to which they are finished is approximately $\frac{1}{32}$ of an inch less than the inner diameter of the rim 2. The inclined faces 10 of the spokes 3 are on a lower plane than the faces 7 and are, therefore, not touched by the turning or finishing tool, the only finish required, as far as the seats 10 are concerned, being a file or grinding finish. This is also true of the contacting faces of the wedges 11.

With a wheel thus finished, if it is desired to apply and secure a rim 4 it is only necessary to pass it over the spokes 2 until the inner edge of the rim engages the flanges 8 formed on the seat sections 7, and as the seats are turned to a diameter which is $\frac{1}{32}$ of an inch less than the inner diameter of the rim, the rim can be placed upon the seat sections without any resistance or driving action.

The bolts 16 are next placed in position and the wedges 11 inserted. The nuts 21 are then tightened up and the rim will consequently be slightly expanded at each point where a wedge is inserted. This draws the rim slightly out around and causes it to bind tightly against the seat sections 7 formed on the spokes 2. This feature of drawing the wheel rim out of a true round formation, by inserting the wedges, does not in any way affect the roundness of the rim as the actual amount that is forced out of true is in most instances only $\frac{1}{64}$ of an inch or less, something which is not noticeable and in no way affects the even wear of the tire 5 which is carried by the rim 4. The wedges 11 are preferably a little high at their outer ends, thus positively preventing the rim 4 from working off of the spokes in the direction of arrow $a$; the rim being positively locked against working off in the opposite direction by the shoulders 8.

By referring to Figs. 8, 9, 10 and 11 it will be seen that a modification of the structure shown in Fig. 1 has been made. This modification merely shows a pair of locking wedges 22 drawn together by a bolt 23 which is provided for the purpose of supporting two rims 4ª. The wedge-receiving spokes employed in this instance are inclined from opposite directions, as shown at 24 (see particularly Fig. 7), and a pair of central lugs 25 are provided for the reception of the locking bolt 23, said lugs being separated to receive a central square collar 26 which secures the bolt against turning when the nuts 27 are being tightened. This collar or head also secures the bolt against endwise movement and prevents the displacing of the wedges while they are being drawn into place. Furthermore, it prevents one wedge from being drawn tighter than the other. The wedges 22 are cut out on one side, as shown at 28, (see Figs. 11 and 12), to permit the wedges to overlap or pass each other and thereby provide an ideal seat for the double rims 4ª.

The intermediate spoke 2ª employed in connection with the modified form of the wheel is similar in construction to the spoke 2 shown in Fig. 1, the only difference being that the face or seat 7 is widened out, as at 7ª, (see Fig. 14) to receive the two rims 4ª. The wedges 22 are also preferably provided with small lug extensions 22ª to permit a hammer or chisel to be applied if they should be rusted into place.

In actual operation, it has been found, particularly in connection with Fig. 1, that the wheel, although used in all sorts of weather has no tendency to rust or become permanently secured to the spokes. This is due to the fact that the moment the wedges 11 are removed the rim 4 has a tendency to resume its normal circular shape. It will thus expand away from the seats 7 formed on the spokes 2 and thereby break any rust formation which may have formed between the seats 7 and the rim. The rim can be removed without hammering or driving it off as the diameter formed between two alined seats 7 is slightly less than the inner diameter of the rim. This is also true of the modified form of the wheel shown in Fig. 8 as the same principle of expanding the rim is also here employed.

Figure 15:
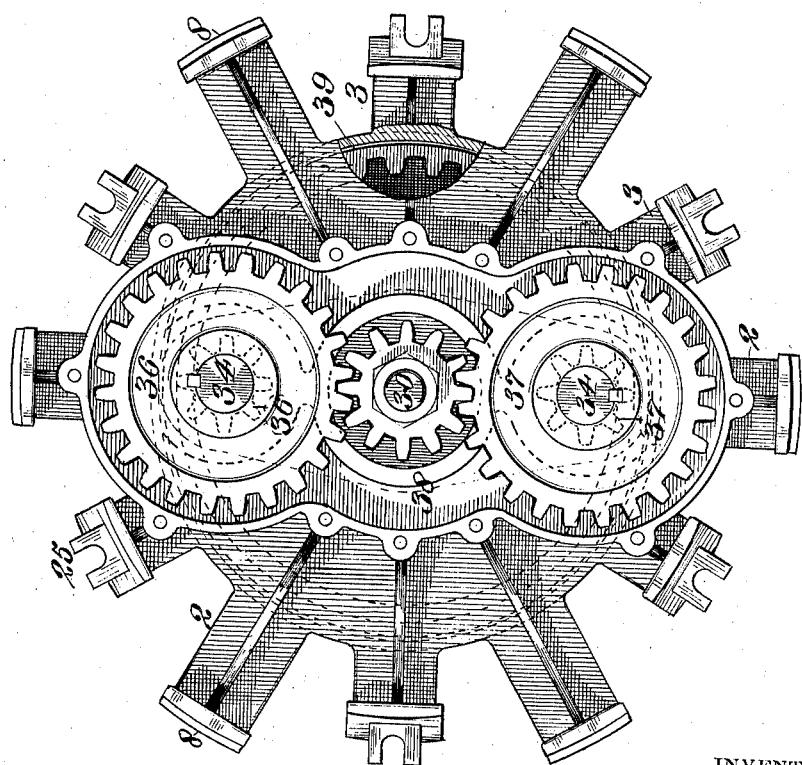
Fig. 15 is a side elevation similar to Fig. 8, showing the rim removed and also the cover of the gear transmission.

The wheel as a whole is preferably employed for heavy duty work in connection with trucks, tractors, and the like, and these wheels may, therefore, be used either as driving wheels or as front wheels. For the purpose of driving the wheel one form has been shown in Figs. 8, 15 and 16. A floating driving axle 30 is in this instance employed which passes through an axle housing 31. Formed exteriorly of said axle housing is a "Timken" or other suitable form of roller bearing 32, upon which the hub 33 of the wheel is supported. Journaled within the wheel in bearings 33 formed between the outer ends of the spokes and the hub are two shafts 34. These shafts may also be supported in roller bearings, as shown at 25, and each shaft is provided for the purpose of supporting two gears 36 and 37. The gears 37 intermesh with a driving pinion 38 secured on the driving shaft 30, while the gears 36 intermesh with a stationary internal gear 39 carried by a drum 40 secured about the axle housing. All the gears are inclosed by a cover plate 41 and it is, therefore, possible to pack the same with grease and to maintain all parts lubricated without resorting to stuffing boxes and the like.

The present gearing arrangement illustrates one method of driving the wheel. However, any other method may be employed, but the present arrangement has been found very desirable particularly where the wheel is employed in connection with tractors and the like where it is desired to transmit a comparatively slow speed. Power transmitted through the shaft 30 passes through the pinion 38 and the intermeshing gears 37. It is here retransmitted through the shafts 34 and the pinions 36 which intermesh with the stationary internal gear 39. The wheel proper is thus caused to rotate and practically any speed desired may be obtained by merely changing the gear ratio shown.

Any form of rim may be employed and any tread desired may be carried by the rim, for instance a solid rubber tire, as shown in Fig. 1, or a spiked grouser rim, such as shown in Fig. 16. These rims, as previously described, can be quickly removed and replaced whenever desired and it is not only possible but also practical to remove the rims and interchange the same when hauling or plowing as comparatively little time is needed in making a change from one form of rim to the other.

While the wheel is here shown as constructed of cast metal and separated spokes, I wish it understood that the seats 7 and 10 may be otherwise supported and that the wheel may be built and constructed in any manner desired or dictated by the judgment of the manufacturer.

Having thus described my invention, what I claim and desire to secure by Letters Patent is—

1. A wheel comprising a plurality of circumferentially arranged supporting members, a wheel rim adapted to be received by said supporting members, oppositely inclined and alined supporting surfaces formed on each alternate supporting member, a wedge adapted to be received by each inclined supporting surface, said wedges forming alined pairs of wedges for each alternate supporting member, a bolt to pass through each pair of wedges, and means for locking said bolt against turning movement, said means also adapted to lock said bolt against endwise movement.

2. A tractor or like wheel of the character described having alternate long and short spokes, the long spokes fitting the interior of the wheel rim and the short spokes having transversely inclined elongated heads out of contact with the rim, wedge members guided and slidable upon the inclined spoke ends to contact with the rim, and securing bolts passing through the wedges, said wedges being cored or chambered to receive the bolts and retain the heads in non-turning position.

3. A wheel comprising a plurality of circumferentially arranged supporting members, a wheel rim adapted to be received by said supporting members, oppositely inclined and alined supporting surfaces formed on each alternate supporting member, a wedge adapted to be received by each inclined supporting surface, said wedges forming alined pairs of wedges for each alternate supporting member, a bolt to pass through each pair of wedges, means for locking said bolt against turning movement, said means also adapted to lock said bolt against endwise movement, said means comprising a square collar formed on the bolt and a recess formed in the supporting member between the oppositely inclined supporting surfaces for the reception of the collar.

4. A demountable tire securing device for wheel tires including a hub having radial spokes with integral shoes upon their outer ends, one set of which supports a continuous rim and a second set of spokes between those first named which have transversely inclined shoes upon their ends, and wedges adapted to slide upon said inclines, said wedges having flanges to fit against the sides of the shoes, and openings for bolts with nuts to advance the wedges upon the inclined shoes, and means for locking the bolts against turning movement.

5. In a demountable wheel tire securing device of the character described, a wheel with radial spokes, two rims and rim supporting shoes upon the outer ends of the spokes, intermediate spokes having shoes which are inclined transversely from the outer ends to the higher central part, wedges fitted to be moved simultaneously upon the shoes and having centrally channeled lugs, end threaded bolts with central lugs fitting the channels in the wedges, and nuts to advance them and the rims carried by them simultaneously.

In testimony whereof I have hereunto set my hand in the presence of two subscribing witnesses.

WILLIAM H. HOLAHAN.

Witnesses:
JOHN H. HERRING,
W. W. HEALY.